United States Patent [19]

Sakuragi et al.

[11] 4,396,797
[45] Aug. 2, 1983

[54] FLEXIBLE CABLE

[75] Inventors: Shiro Sakuragi; Kyoshiro Imagawa, both of Kyoto, Japan

[73] Assignee: Horiba, Ltd., Kyoto, Japan

[21] Appl. No.: 333,184

[22] Filed: Dec. 21, 1981

[30] Foreign Application Priority Data

Dec. 27, 1980 [JP] Japan ................... 55-189278

[51] Int. Cl.³ ............... H02G 3/04; H01B 7/8; F16L 11/00
[52] U.S. Cl. .................. 174/68 C; 138/110; 138/120; 174/111
[58] Field of Search ............ 138/108, 120, 155, 110; 174/86, 111, 68 C; 285/163; 191/12 C

[56] References Cited

U.S. PATENT DOCUMENTS

| 276,472 | 4/1883 | Rittenhouse et al. | 138/120 X |
| 428,023 | 5/1890 | Schoff | 174/111 X |
| 536,419 | 3/1895 | Cochrane | 138/120 X |
| 1,276,117 | 8/1918 | Riebe | 138/120 X |
| 2,173,539 | 9/1939 | Peters et al. | 174/111 X |
| 3,189,372 | 6/1965 | Johnson | 285/163 X |
| 3,329,967 | 7/1967 | Martinez et al. | 138/120 X |
| 3,910,277 | 10/1975 | Zimmer | 138/120 X |

FOREIGN PATENT DOCUMENTS

| 18526 | of 1889 | United Kingdom | 174/111 |
| 1524033 | 9/1978 | United Kingdom | 138/120 |

Primary Examiner—Stephen Marcus
Assistant Examiner—Mark John Thronson
Attorney, Agent, or Firm—Wenderoth, Lind & Ponack

[57] ABSTRACT

A flexible cable suitably used as a jacket or cover for an inner conduit member such as a gas conduit or a liquid conduit, a signal transmission line, or an energy transmission line, or the like, which can provide safe use of the conduit inserted thereinto by limiting the bending radius thereof. The cable includes a plurality of axially symmetrical pipe members having large and small diameter ends which are assembled with the small ends of each pipe member fitted into the large end of an adjacent pipe member and loosely fitting flexible ring members fitted over the small ends of the pipe members.

5 Claims, 8 Drawing Figures

FLEXIBLE CABLE

BACKGROUND OF THE INVENTION

The present invention relates to a flexible cable suitably used as a jacket pipe for a gas conduit, or a liquid conduit, a covering pipe for a signal transmission line or an energy (power) transmission line and the like.

For example, a gas conduit made of rubber can be bent at an optional radius of curvature depending upon the materials used and the ratio of the inside diameter thereof to an outside diameter thereof because it is flexible. However, the passage of gas through the gas conduit is disturbed if the radius of curvature is small, for the cross section of the gas conduit is changed from oval-shaped to flat. For this reason, a gas conduit of rubber should be bent at a radius of curvature of such an extent that the passage of gas through the gas conduit cannot be disturbed. Such a desired radius of curvature of bending has not been objectively determined but has been determined on the basis of the experiences and the sixth sense of user. Accordingly, there have frequently been accidental gas leaks and the like when a gas conduit made of rubber is bent at a radius of curvature smaller than the above described desired radius of curvature. Similar problems have occurred with flexible liquid conduit and the like.

SUMMARY OF THE INVENTION

It is an object of the present invention to provide a flexible cable, which is designed so as to safely limit the bending radius of an inner conduit member such as a flexible gas conduit or liquid conduit, signal transmission line, energy transmission line or the like which it coaxially surrounds.

A flexible cable of the present invention includes joint members limiting an allowable bending radius thereof in order to achieve this object.

A flexible cable of the present invention can be very effectively used to effect the safe use of the conduit or transmission line by absolutely and objectively securing the latter by inserting the flexible gas conduit, liquid conduit, signal transmission line, energy transmission line or the like in the flexible cable, because the flexible cable itself is limited in its allowable bending radius.

It is another object of the present invention to provide such a flexible cable having a construction which is as simple as possible.

Further objects and advantages of the present invention will appear from the following description.

BRIEF DESCRIPTION OF THE DRAWINGS

The accompanying drawings show the preferred embodiments of a flexible cable according to the present invention, in which FIG. 1 (A) shows an example of a flexible cable of the present invention, FIG. 1 (B) shows a flexible cable as shown in FIG. 1 (A) which is in a bent state, FIG. 2 (A) is a cross-sectional view showing pipes constructing the flexible cable, FIG. 2 (B) shows the connection of the pipes to each other, FIGS. 3 to 6 show further examples of a flexible cable of the present invention, in which FIGS. 3 and 4 are cross-sectional views of one further example, FIG. 5 is a front view of a second further example, and FIG. 6 is a cross-sectional view of a third further example.

DESCRIPTION OF THE PREFERRED EMBODIMENTS

Figure 1A:
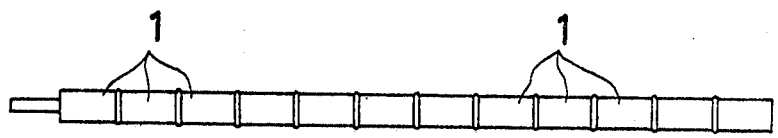
Figure 1B:
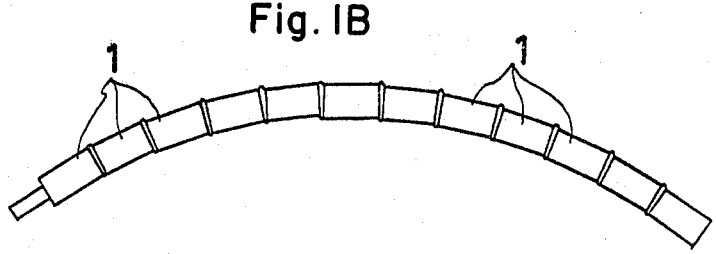

The preferred embodiments of the present invention will be made clear hereinafter by reference to the attached drawings. FIGS. 1 (A) and (B) show an example of a flexible cable of the present invention having a joint member construction in which a plurality of pipes 1 is connected in series. This joint member construction is a construction similar to the body construction of an insect, earthworm and the like which consists of many ring-shaped separate joints. The pipes 1 as shown in the drawings corresponds to these separate joints. In addition, a flexible cable of the present invention is provided with members for fixedly mounting the end pipes 1 at both ends thereof although the members are not shown in the drawings.

Figure 2A:
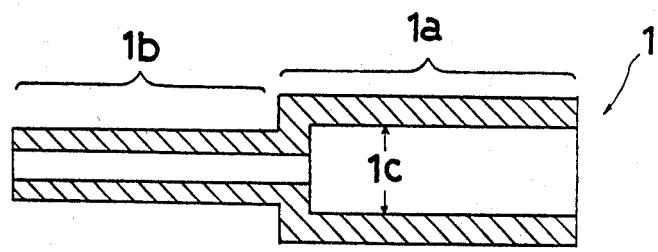
Figure 2B:
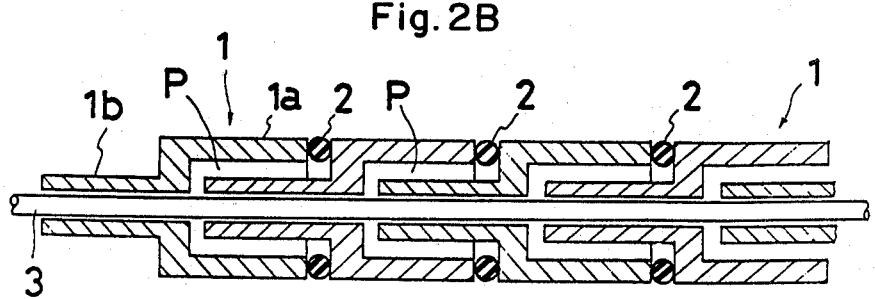

As shown in FIG. 2 (A), each pipe 1 has an unsymmetrical construction in which an outside diameter of the right half 1a thereof is larger than an outside diameter of the left half 1b thereof and an inside diameter 1c from the right end thereof to a certain depth therefrom is larger than an inside diameter of the remaining portion thereof. As shown in FIG. 2(A), the halves 1a and 1b have lengths approximately equal to the total lengths of the pipes 1. This inside diameter 1c is somewhat larger than the outside diameter of the left half 1b of each pipe 1. As shown in FIG. 2 (B), pipes 1 are connected in series so that a definite size of clearance may be formed between an internal surface of each pipe 1 and an external surface of adjacent pipe 1 at the left half 1b which is inserted into first mentioned pipe 1, the clearance being designated by P. This clearance allows the pipes to pivot relative to one another. The limit of a bending radius of a flexible cable consisting of a number of pipes 1 connected with each other can be made equal to the allowable bending radius of the flexible gas conduit, liquid conduit or the like by suitably selecting the clearance. Referring to the drawings, reference numeral 2 designates rubber rings placed between pipes 1 and reference numeral 3 designates a flexible gas conduit, liquid conduit or the like inserted into the flexible cable. The rings are loosely fitted over smaller left halves 1b of pipes 1 so as to be engaged on opposite sides by the end faces of confronting end faces of adjacent larger right halves 1a of the pipes 1. In the embodiment shown, rings 2 have an internal diameter equal to the internal diameter of the right halves 1a of the pipes 1. The length of a passage through the flexible cable, into which the gas conduit or the like is inserted, when the flexible cable is bent, can be equalized with the length of the passage of the flexible cable, into which the gas conduit or the like is inserted, when the flexible cable is stretched in a straight line, by the action of elastic shrinkage of rubber rings 2.

Figure 3:
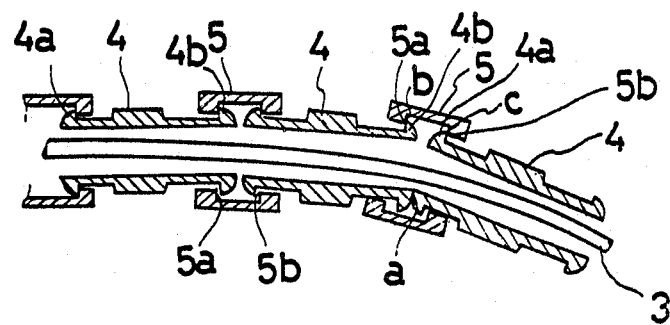
Figure 4:
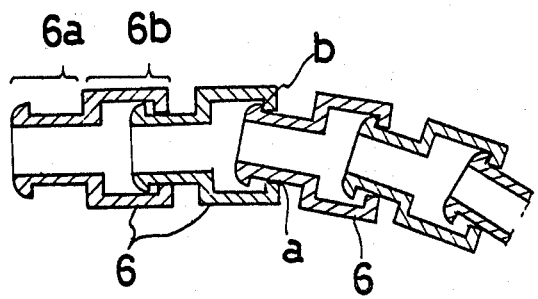
Figure 5:
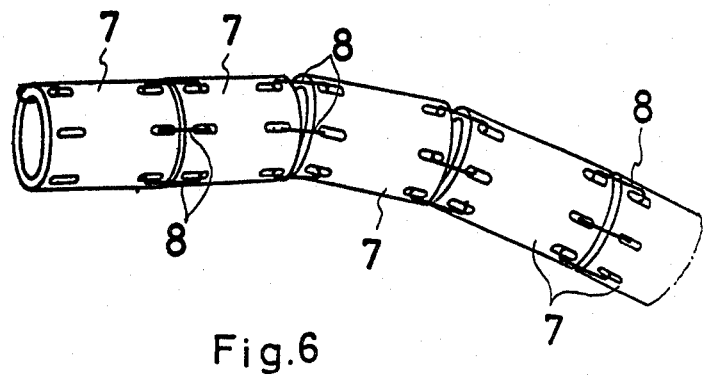
Figure 6:
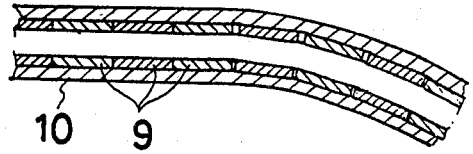

FIGS. 3 to 6 show other examples of the flexible cable of the present invention. A flexible cable shown in FIG. 3 is construction from two kinds of pipes 4 and 5 having different shapes engaged with each other alternately. That is to say, pipes 4 are provided with outwardly protruded ring-shaped engaging portions 4a, 4b at opposite ends thereof while pipes 5 are provided with engaging portions 5a, 5b slidably engaged with engaging portions 4a, 4b on the internal face side thereof. The limit of bending radius of a flexible cable consisting of two kinds of pipes 4 and 5 having different shapes and engaged with each other alternately is determined by the engagement of engaging portions 4a of said pipes 4 with engaging portions 4b of said pipes 4 at a point a, the engagement of engaging portions 4a of said pipes 4 with engaging portions 5b of said pipes 5 at a point b and the engagement of engaging portions 4b of said pipes 4 with engaging portions 5a of said pipes 5 at a point c. FIG. 4 shows an example of a flexible cable of the present invention constructed from pipes 6, of which left halves 6a have the same shapes as the left of halves of pipes 4 shown in the above described example and right halves 6b have the same shapes as pipes 5. Also in this construction, the engagement of a point a with a point b can limit the bending radius of the flexible cable. It is desired from a viewpoint of convenient assembly of said pipes 4, 5, 6 shown in this example and an example as shown in FIG. 3, that pipes 4, 5, 6 are made of synthetic resin. In particular, a flexible cable having a construction as shown in FIG. 4 can be fabricated inexpensively and in a simple form as a whole because the joint member construction is constructed from only pipes 6 having the same construction. These pipes may be fabricated from any materials for flexible cables as described in this example, not to mention other examples, including the following examples as shown in FIGS. 5 and 6.

The flexible cable shown in FIG. 5 is constructed from cylindrical pipes 7, which are generally used, connected with each other with clearance by means of wires or strings 8 so that a bending radius of the flexible cable may be limited depending upon the size of the clearance. Although a flexible cable as shown in FIG. 5 requires wires or strings 8 or the like in addition to pipes 7, it can be very easily fabricated because cylindrical pipes 7 themselves are simple in construction.

The flexible cable shown in FIG. 6 is constructed from cylindrical pipes 9 surrounded by heat shrinkable tubes 10 connected with each other. Pipes 9 ae connected so that the engagement of pipes 9 between themselves at the end portions thereof and the degree of extension of heat shrinkable tubes 10 may limit the bending radius of the flexible cable. A flexible cable having a construction as shown in FIG. 6 can be fabricated inexpensively because said pipes 9 themselves each have a simple cylindrical form and tubes 10 also have a simple construction.

What is claimed is:

1. A flexible cable device, comprising:
    a. a flexible cable, including
        (1) a plurality of longitudinally axially symmetrical pipe members, each having a cylindrical large diameter end and a cylindrical small diameter end, each of said large diameter and small diameter ends having uniform internal and external diameters, the large diameter end of each of said plurality of pipe members terminating at a first and a second vertical end face at opposite axial ends thereof, the internal diameter of said large diameter end exceeding the external diameter of said small diameter end by a clearance amount P, said plurality of pipe members being assembled together along their longitudinal axes with said small diameter end of each of said plurality of pipe members being inserted into said large diameter end of an adjacent one of said plurality of pipe members so that said first and second end faces of adjacent ones of said plurality of pipe members are in confronting relation to each other, and
        (2) a plurality of flexible resilient ring members, each of said pipe members having one of said plurality of ring members loosely fitted over the small diameter end thereof interposed between confronting ones of said first and second end faces so as to be engaged on opposite sides by said first and second end faces; and
    b. an inner conduit member extending in said cable along its longitudinal axis; said clearance amount P being selected such that if the cable is bent to its maximum bending curvature said inner conduit member will not be damaged.

2. A flexible cable device as in claim 1, wherein said inner conduit member comprises a signal transmission line.

3. A flexible cable device as in claim 1, wherein said inner conduit member comprises a power transmission line.

4. A flexible cable device as in claim 1, wherein said ring members have internal diameters equal to the internal diameters of said large diameter ends.

5. A flexible cable device as in claim 1, wherein the lengths of said large diameter ends and said small diameter ends are approximately equal to one half the lengths of said pipe members.

* * * * *